(12) United States Patent
Shin et al.

(10) Patent No.: US 8,388,869 B2
(45) Date of Patent: Mar. 5, 2013

(54) THERMALLY CONDUCTIVE RESIN COMPOSITION INCLUDING A MILLED PITCH BASED CARBON FIBER

(75) Inventors: Chan Gyun Shin, Uiwang-si (KR); Jeong Won Lee, Uiwang-si (KR); Jong Cheol Lim, Uiwang-si (KR); Eun Joo Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/338,757

(22) Filed: Dec. 28, 2011

(65) Prior Publication Data

US 2012/0175548 A1    Jul. 12, 2012

(30) Foreign Application Priority Data

Dec. 31, 2010    (KR) .................. 10-2010-0140147

(51) Int. Cl.
| | | |
|---|---|---|
| H01B 1/06 | (2006.01) | |
| H01B 1/24 | (2006.01) | |
| H01B 1/04 | (2006.01) | |
| B60C 1/00 | (2006.01) | |
| C08K 3/04 | (2006.01) | |

(52) U.S. Cl. .............. 252/511; 252/75; 252/73; 252/71; 252/502; 524/496; 524/495

(58) Field of Classification Search .................... 252/75, 252/73, 71, 511, 502; 524/495, 496
See application file for complete search history.

(56) References Cited

U.S. PATENT DOCUMENTS

| | | | | |
|---|---|---|---|---|
| 5,321,071 A | * | 6/1994 | Fujisawa et al. .............. 524/496 |
| 5,844,036 A | * | 12/1998 | Hughes ......................... 524/494 |
| 6,048,919 A | * | 4/2000 | McCullough ................. 524/404 |
| 6,150,446 A | * | 11/2000 | Numata ......................... 524/406 |
| 6,976,769 B2 | * | 12/2005 | McCullough et al. ........ 362/345 |
| 2002/0058743 A1 | * | 5/2002 | Tobita et al. .................. 524/495 |
| 2003/0055154 A1 | * | 3/2003 | Urata ............................. 524/495 |
| 2003/0064017 A1 | * | 4/2003 | Tobita et al. ................. 423/447.2 |
| 2003/0127291 A1 | * | 7/2003 | Wood et al. ............. 188/218 XL |
| 2003/0146418 A1 | * | 8/2003 | Chacko ......................... 252/511 |

FOREIGN PATENT DOCUMENTS

| | | | |
|---|---|---|---|
| EP | 0421881 A1 | * | 4/1991 |
| JP | 1977-12240 | | 1/1977 |
| JP | 09-059592 A | * | 3/1997 |

OTHER PUBLICATIONS

JP 09-059592 A, Yoshimura et al., pub'd Mar. 1997, machine translation see "JP09-059592_machtrans.pdf".*
Osaka Gas, DONACARBO milled Carbon Fibers product information, www.ogc.co/jp/e/products/carbon-f/donacarbo_milled.html, obtained Jun. 28, 2012. see "OsakaGas_DONACARBOmilled.pdf".*

* cited by examiner

*Primary Examiner* — Peter F Godenschwager
*Assistant Examiner* — Jane L Stanley
(74) *Attorney, Agent, or Firm* — Summa, Additon & Ashe, P.A.

(57) ABSTRACT

Disclosed is a thermally conductive resin composition including (A) about 40 to about 70% by weight of polyphenylene sulfide based resin; (B) about 20 to about 30% by weight thermally conductive graphite; and (C) about 10 to about 30% by weight milled pitch based carbon fiber. The resin composition can have excellent thermal conductivity by improving thermal conductivity in a plane-direction and thermal conductivity in a Z-direction and also can have commercially usable impact strength.

8 Claims, 2 Drawing Sheets

| Material | | Thermal Conductivity (W/m·k) | Density (g/cm³) |
|---|---|---|---|
| FN-100 (Pitch based) | Carbon Fiber | 900 | 2.22 |
| HC-600 (Pitch based) | Carbon Fiber | 600 | 2.22 |
| XN-90 (Pitch based) | Carbon Fiber | 500 | 2.19 |
| XN-80 (Pitch based) | Carbon Fiber | 320 | 2.17 |
| Copper | Metal | 400 | 8.9 |
| Aluminum Alloy | Metal | 100-200 | 2.7 |
| Boron Nitride (BN) | Ceramics | 85 | 2 |
| Carbon Fiber (PAN regular grade) | Carbon Fiber | 10 | 1.7 |
| Carbon Fiber (PAN HM grade) | Carbon Fiber | 76 | 1.8 | ns such as their high density which make it difficult to make the...

THERMALLY CONDUCTIVE RESIN COMPOSITION INCLUDING A MILLED PITCH BASED CARBON FIBER

CROSS-REFERENCE TO RELATED APPLICATION

This application claims priority under 35 USC Section 119 to and the benefit of Korea Patent Application No. 10-2010-0140147 filed on Dec. 31, 2010 in the Korean Intellectual Property Office, the disclosure of each of which is incorporated herein by reference in its entirety.

FIELD OF THE INVENTION

The present invention relates to a resin composition that can have high thermal conductivity.

BACKGROUND OF THE INVENTION

Metal has been the most frequently used material for a heat radiating member such as the main body, chassis or heat radiating plate of most electronic equipment having exothermic parts. This is because metal has high thermal conductivity such that it can diffuse heat more quickly to the surroundings than other materials so as to protect electronic parts that are sensitive to heat from local high temperatures. Moreover, metal has high mechanical strength and also workability via plating, molding or cutting such that it can be appropriately used as a material for a heat radiating member which typically has a complex shape. However, metals have disadvantages, such as their high density which make it difficult to make the metal lightweight, and the high unit price thereof. Because of these disadvantages of metal, there has been a focus on thermally conductive resins to replace metal as a material for heat radiating members. As a result, heat radiating members such as heat radiating sheets or heat radiating grease using a thermally conductive resin have been used for printers, copying machines, notebook computers and the like.

Recently, as electronic equipment becomes highly integrated and efficient, more heat is generated in the electronic equipment. Moreover, as electronic equipment becomes thinner and lightweight, it is even more difficult to diffuse heat generated in the electronic equipment to the surroundings. As a result, the local high-temperature state resulting from heat generated in the electronic equipment, which can lead to a malfunction or a fire, has increasingly become a problem. However, the thermal conductivity of the thermally conductive resins developed up to date is not enough to solve this problem.

Furthermore, when increased amounts of thermally conductive filler are added to a thermally conductive resin to improve thermal conductivity of the resin composition, the injection moldability of the thermally conductive resin deteriorates so that the manufacture of a product using the same becomes more difficult. Moreover, the mechanical strength of a product manufactured using the thermally conductive resin also deteriorates. Therefore, it is important to form an effective network of fillers in a resin composition in order to minimize the amounts of fillers and maximize the thermal conductivity at the same time. Furthermore, a resin having low viscosity should be used in order to prevent the deterioration of injection moldability when the fillers are added in large amounts.

Typically, a resin having low viscosity should have a low molecular weight. When the molecular weight of the resin is low, however, reactivity between polymer chains can increase and some side effects such as progress of hardening due to reaction in extrusion and injection molding processes can occur.

Accordingly, it is important to form an effective network of fillers in a resin matrix in order to produce a thermally conductive resin composition which can be injection-molded and is important to improve filling with the fillers by reducing the viscosity of the resin. Furthermore, it is also important to stabilize color and other mechanical properties (processing stability) when the resin stays in a cylinder of molding machine such as an injection molding machine for a long time.

SUMMARY OF THE INVENTION

The present invention relates to a thermally conductive resin composition. The thermally conductive resin composition includes (A) about 40 to about 70% by weight of polyphenylene sulfide based resin; (B) about 20 to about 30% by weight of thermally conductive graphite; and (C) about 10 to about 30% by weight of milled pitch based carbon fiber.

In exemplary embodiments, the thermally conductive graphite (B) comprises a first thermally conductive graphite having a length-to-height ratio of about 7,000 to about 40,000; and a second thermally conductive graphite having a length-to-height ratio of about 10 to about 1,000. The first thermally conductive graphite and the second thermally conductive graphite can be present in a weight ratio of about 10:90 to about 90:10.

In exemplary embodiments, the thermally conductive graphite (B) and the milled pitch based carbon fiber (C) can be mixed at a weight ratio of about 0.6:1 to about 4:1.

The thermally conductive resin composition can have excellent thermal conductivity in both a plane-direction and a Z-direction and further can have excellent flowability. In exemplary embodiments, the thermally conductive resin composition can have a thermal diffusivity in a plane-direction of about 0.040 to about 0.250 $cm^2/sec$ and a thermal diffusivity in a Z-direction of about 0.050 to about 0.085 $cm^2/sec$ and can have a flowability of more than about 80 mm.

The present invention further provides a molded product made from the thermally conductive resin composition.

DETAILED DESCRIPTION OF THE INVENTION

Figures 1, 2:
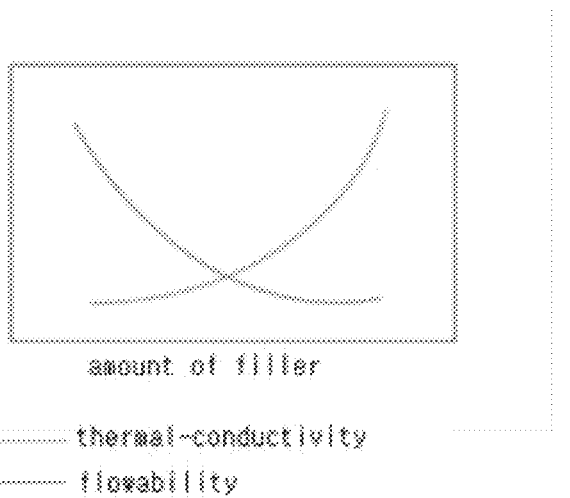
FIG. 1 is a graph illustrating the relationship between thermal conductivity and flowability in a thermally conductive resin composition according to the amount of filler.
FIG. 2 is a chart comparing thermal conductivity in polyacrylonitrile (PAN) based carbon fiber, metal fiber, and pitch based carbon fiber.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Polyphenylene Sulfide Based Resin

The polyphenylene sulfide based resin of the present invention is a thermoplastic resin. The polyphenylene sulfide resin can have heat resistance at high temperatures and can maintain properties at room temperature even if the temperature is −50° C. Further, the polyphenylene sulfide based resin can have excellent dimensional stability throughout a large range of temperatures and creep resistance. Moreover, the polyphenylene sulfide based resin is non-toxic and stable, flame retardant, and has relatively low viscosity.

A linear polyphenylene sulfide resin including more than about 70 mole % of a repeating unit represented by the following Formula 1 can be used as the polyphenylene sulfide based resin.

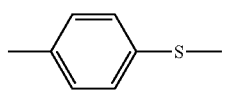

[Formula 1]

A polyphenylene sulfide resin including more than about 70 mole % of the repeating unit can exhibit high crystallinity, which is a characteristic of crystalline polymers, and superior heat resistance, chemical resistance and mechanical strength. A representative method for preparing the linear polyphenylene sulfide resin including the repeating unit is disclosed in Japanese Patent Publication No. 1977-12240.

The polyphenylene sulfide based resin may include at least one other repeating unit, in addition to the repeating unit of the Formula 1. The polyphenylene sulfide based resin can include the repeating units of Formulas 2 to 9 in an amount of less than about 50 mole %, for example less than about 30 mole %. The other repeating units are represented by the following Formulas 2 to 9.

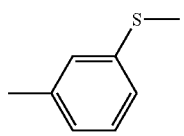

[Formula 2]

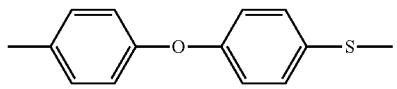

[Formula 3]

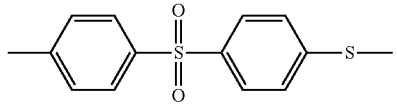

[Formula 4]

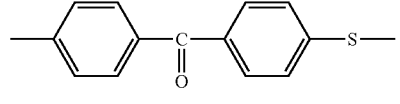

[Formula 5]

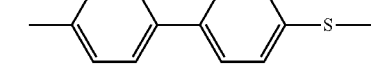

[Formula 6]

[Formula 7]

In Formula 7, R is alkyl, nitro, phenyl, alkoxy, carboxyl, or metal carboxylate.

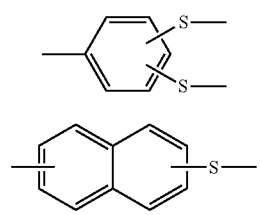

[Formula 8]

[Formula 9]

In exemplary embodiments, a polymer including more than about 50 mole % of p-dichlorobenzene and sodium sulfide as polymerization materials can be used as the polyphenylene sulfide based resin.

A polyphenylene sulfide based resin having low viscosity is desirable for preparing the resin composition having high thermal conductivity because the resin having low viscosity is beneficial for high filling of thermally conductive inorganic filler.

In exemplary embodiments, the polyphenylene sulfide based resin can have a weight-average molecular weight of about 3,000 to about 50,000, for example about 5,000 to about 30,000, so that the resin has low viscosity. When the polyphenylene sulfide resin has a weight-average molecular weight within the above range, concerns of hardening due to the reaction between resins during extrusion and injection molding processes can be reduced because the resin can have excellent processing stability.

In exemplary embodiments, the thermally conductive resin composition can include the polyphenylene sulfide based resin in an amount of about 40 to about 70% by weight based on about 100% by weight of the resin composition. In some embodiments, the thermally conductive resin composition can include the polyphenylene sulfide based resin in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70% by weight. Further, according to some embodiments of the present invention, the amount of the polyphenylene sulfide based resin can be in a range from about any of the foregoing amounts to about any other of the foregoing amounts.

When the thermally conductive resin compositions include the polyphenylene sulfide resin in an amount within the above range, the composition can have a balance between thermal conductivity and mechanical properties.

(B) Thermally Conductive Graphite

The present invention includes thermally conductive graphite as thermally conductive filler. The thermally conductive graphite has both thermal conductivity and also self-lubricity. Therefore, the thermally conductive graphite can provide a same effect as the addition of a lubricant by decreasing the coefficient of friction when the thermally conductive graphite and the other fillers are added to the polyphenylene sulfide based resin.

As shown in FIG. 1, when the amounts of thermally conductive filler are increased, generally, flowability of the thermally conductive resin composition decreases and thermal conductivity of the thermally conductive resin composition increases. It is important to gain flowability in thermally conductive resin compositions, however, because processing problems can occur in manufacturing the resin composition if flowability of the resin composition decreases. In order to gain flowability, the present invention solves the flowability problem and gains desirable thermal conductivity at the same time by including the thermally conductive graphite having self-lubricity into the resin composition.

The thermally conductive graphite can be classified into two types, natural graphite and artificial graphite, and these two types of graphite can have a plate-like structure. The shapes of the plate-like structure can include flake, irregular spheroids or needle-shaped plates and the graphite can be laminated with several plates. As used throughout the present specification, reference to a ratio of the laminated plate length to the plate height of the plates is defined as length-to-height, ratio (L/H). Therefore, the "length-to-height ratio" increases as the length of the laminated plate structure is longer and the thickness of the laminated plate structure is thinner.

The thermal conductivity of a complex of resin and thermally conductive inorganic filler in a thermally conductive resin composition can be affected by the amount of contact (junction or interface) between the thermally conductive inorganic fillers distributed in the resin composition or contact between the resin and the thermally conductive inorganic filler. To prepare a thermally conductive resin composition having a high thermal conductivity, defects in the crystalline structure of the thermally conductive inorganic filler should be low. In addition, the amount of contact between the thermally conductive inorganic fillers or between the resin and the thermally conductive inorganic filler should be low. Therefore, thermally conductive inorganic filler having a large average crystal size can be used to increase the thermal conductivity of the thermally conductive resin composition. Further it can be important to select an average crystal size of the thermally conductive inorganic filler which does not have a large effect or impact on the appearance or properties of the final product made from the thermally conductive resin composition. In exemplary embodiments, the thermally conductive network can be effectively formed with thermally conductive inorganic filler in a thermally conductive resin composition, and contact can be with a large area. Therefore, an effective thermally conductive network can be formed with large-sized thermally conductive inorganic filler in a small amount.

For this purpose, a thermally conductive network should be formed between thermally conductive inorganic fillers and, therefore, the opportunity of meeting or contact between thermally conductive inorganic fillers should be increased. There is a method for changing the shape of thermally conductive inorganic filler to increase this opportunity. The method relies on a principle that the surface area is reduced as the shape of thermally conductive filler becomes close to a sphere at a constant mass, whereas it increases as the filler has a shape elongated to one side like a thread. When the length-to-height ratio, i.e. L/H value, of the thermally conductive inorganic fillers in a thermally conductive resin composition is increased, the surface area of the thermally conductive inorganic fillers will be increased and the chance of contact between the thermally conductive inorganic fillers will also be increased. This can increase the thermal conductivity by forming paths along which heat in a resin composition can pass.

For example, graphite as a thermally conductive inorganic filler has anisotropic thermal conductivity.

Therefore, the thermal conductivity in the length direction of the graphite plate is higher than the thermal conductivity in the thickness direction of the graphite plate. As described above, even if at a constant mass of the graphite, L/H value increases and thus the surface area of graphite will increase. As a result, the chance of contact with graphite increase and the thermal conductivity of the resin composition will increase.

However, even though graphite having a high L/H value is used, the filling amount should be increased to provide a highly thermally conductive resin composition. However, if the contact between graphite increases more than needed as the filling amount is excessively high, the thermal conductivity will not effectively increase because the excessive amount of graphite can interfere with thermal conductivity.

Therefore, if a graphite which has a relatively low L/H value but is effective for heat conduction because of its large crystal size is added in a certain amount, a graphite having a high L/H value will form a path capable of heat conduction, whereas the graphite having a low L/H value, i.e. graphite with a small surface area and high thermal conductivity because the crystal size is large, can have the affect of improving the entire thermal conductivity in the resin composition.

As a result, an effective thermally conductive network can be formed by using two or more kinds of graphite having different L/H values. In this manner, a thermally conductive resin composition with high thermal conductivity using a relatively small filling amount of graphite which is also capable of being injection-molded can be prepared.

In an embodiment of the present invention, different thermally conductive inorganic fillers having different length-to-height ratios (L/H ratios) can be used.

In exemplary embodiments, the first thermally conductive graphite can have a length-to-height ratio of about 7,000 to about 40,000 and the second thermally conductive graphite can have a length-to-height ratio of about 10 to about 1,000.

When the first thermally conductive graphite having a length-to-height ratio of about 7,000 to about 40,000 is added, the first thermally conductive graphite can have a length-to-height ratio of more than about 7,000, for example about 7,000 to about 40,000 and as another example about 10,000 to about 40,000 because in general the graphite having a length-to-height ratio of more than 7,000 can be included even if the target value is more than 7,000.

In exemplary embodiments, the first thermally conductive graphite and the second thermally conductive graphite can be mixed in a weight ratio of about 90:10 to 10:90, for example about 40:60 to about 60:40.

In some embodiments, the mixture of the first thermally conductive graphite and the second thermally conductive graphite can include the first thermally conductive graphite in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the first thermally conductive graphite can be in a range from about any of the foregoing amounts to about any other of the foregoing amounts.

In some embodiments, the mixture of the first thermally conductive graphite and the second thermally conductive graphite can include the second thermally conductive graphite in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the second thermally conductive graphite can be in a range from about any of the foregoing amounts to about any other of the foregoing amounts.

When the first graphite and the second graphite are mixed in an amount within the above-ratio, workability can be excellent and the compositions can have a good balance between thermal conductivity and the processing stability.

The thermally conductive resin composition can include the graphite in an amount of about 20 to about 30% by weight, based on about 100% by weight of the thermally conductive resin composition. In some embodiments, the thermally conductive resin composition can include the graphite in an amount of about 20, 21, 22, 23, 24, 25, 26, 27, 28, 29, or 30% by weight. Further, according to some embodiments of the present invention, the amount of graphite can be in a range from about any of the foregoing amounts to about any other of the foregoing amounts.

When the thermally conductive resin composition includes the graphite in an amount within the above range, the resin composition can have excellent thermal conductivity and mechanical properties.

(C) Milled Pitch Based Carbon Fiber

The present invention includes pitch based carbon fiber as a thermally conductive filler in addition to the graphite. Generally, based on the raw materials used in a precursor solution of the carbon fiber, the carbon fibers can be classified into two types: polyacrylonitrile (PAN) based carbon fibers in which the raw material is polyacrylonitrile; and pitch based carbon fibers in which the raw material is pitch from petroleum and coal.

As shown in FIG. 2, the thermal conductivity of PAN based carbon fiber is significantly lower than that of metals such as aluminum alloy or copper. On the other hand, pitch based carbon fiber has a thermal conductivity of about 320 to about 900 W/mK and its thermal conductivity is superior to that of PAN based carbon fiber.

Figure 3:
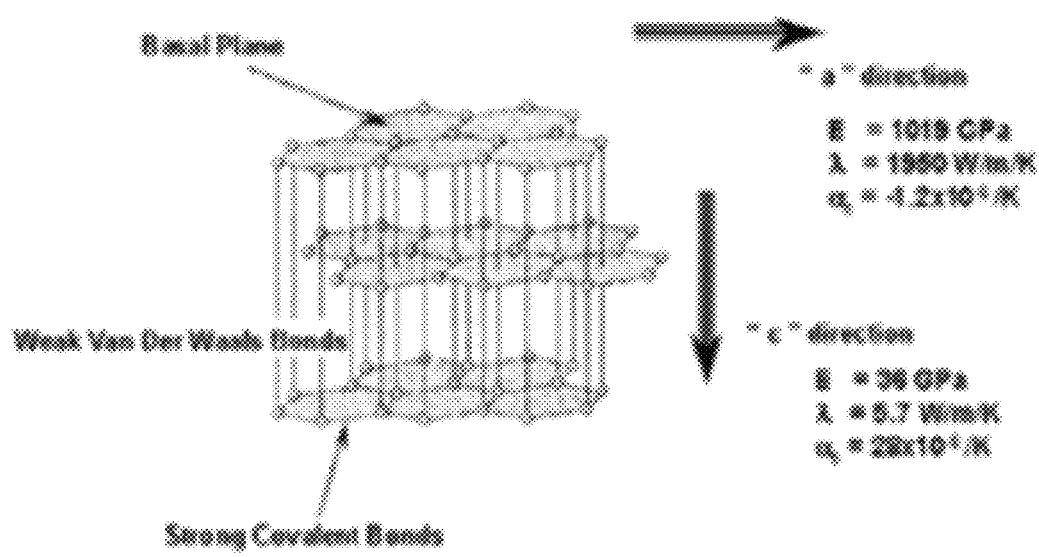
FIG. 3 schematically illustrates the structure of carbon fiber and thermal conductivity due to the structure.

As shown in FIG. 3, the carbon fiber has a layered structure. In the plane-direction of the chemical structure (designated as the "a" direction in FIG. 3), adjacent carbon atoms are connected with strong covalent bonds and the thermal conductivity is excellent. However, in the Z-direction of the chemical structure (designated as the "c" direction in FIG. 3), carbon atoms of carbon planar layers are connected by Van der Waals forces, and the connecting force is weaker than that in the plane-direction and the thermal conductivity is significantly lower than that in the plane-direction.

Moreover, the thermal conductivity in the Z-direction can deteriorate as the carbon fiber is oriented under conditions such as high injection pressure and temperature when a resin composition including carbon fiber is processed using an injection molding process.

In order to maintain the excellent thermal conductivity of the plane-direction of pitch based carbon fiber and improve thermal conductivity of the Z-direction at the same time, the pitch based carbon fiber in a milled state, i.e. crushed state, can be added to the resin composition so that thermal conductivity of the Z-direction is improved as the orientation can be removed.

The milled pitch based carbon fiber can have an average diameter of about 10 to about 20 µm, a length of about 0.1 to about 100 µm, and an aspect ratio (length-to-height ratio, L/H) of about 0.005 to about 10 in order to form an effective thermally conductive network in the resin composition and to improve the thermal conductivity of the Z-direction.

In some embodiments, the milled pitch based carbon fiber can have an average diameter of about 10, 11, 12, 13, 14, 15, 16, 17, 18, 19, or 20 µm. Further, according to some embodiments of the present invention, the average diameter of the milled pitch based carbon fiber can be in a range from about any of the foregoing amounts to about any other of the foregoing amounts.

In some embodiments, the milled pitch based carbon fiber can have a length of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 µm. Further, according to some embodiments of the present invention, the length of the milled pitch based carbon fiber can be in a range from about any of the foregoing amounts to about any other of the foregoing amounts.

In some embodiments, the milled pitch based carbon fiber can have an aspect ratio of about 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10. Further, according to some embodiments of the present invention, the aspect ratio of the milled pitch based carbon fiber can be in a range from about any of the foregoing amounts to about any other of the foregoing amounts.

The thermally conductive resin composition can include the milled pitch based carbon fiber in an amount of about 10 to about 30% by weight based on about 100% by weight of the thermally conductive resin composition. In some embodiments, the thermally conductive resin composition can include the milled pitch based carbon fiber in an amount of about 10, 11, 12, 13, 14, 15, 16, 17, 18, 19, 20, 21, 22, 23, 24, 25, 26, 27, 28, 29, or 30% by weight. Further, according to some embodiments of the present invention, the amount of milled pitch based carbon fiber can be in a range from about any of the foregoing amounts to about any other of the foregoing amounts.

Further, exemplary embodiments can include the thermally conductive graphite (B) and the milled pitch based carbon fiber (C) in a ratio of about 0.6:1 to about 4:1. When the thermally conductive resin composition includes the thermally conductive graphite and the milled pitch based carbon fiber in a weight ratio within the above range, the thermal conductivity in the Z-direction can be improved so that the resin composition can have excellent thermal conductivity and excellent mechanical properties due to the strength of the carbon fiber itself.

(D) Additives

The thermally conductive resin composition of the present invention may further comprise one or more additives to improve properties without deterioration of the thermal conductivity. In exemplary embodiments, the resin composition may further comprise one or more other additives such as but not limited to glass fiber, glass bead, $CaCO_3$ and the like, and combinations thereof to increase the filling ratio of the thermally conductive filler such as carbon fiber or improve mechanical properties of the resin composition. Further, the resin composition may further comprise one or more other additives such as but not limited to antioxidants, releasing agents, lubricants, and the like, and combinations thereof.

The thermally conductive resin composition of the present invention can have a thermal diffusivity in the plane-direction of about 0.040 to about 0.250 $cm^2$/sec, a thermal diffusivity in the Z-direction of about 0.050 to about 0.085 $cm^2$/sec and a flowability of more than about 80 mm.

The thermally conductive resin composition can be prepared using conventional methods for making a resin composition. For example, the thermally conductive resin composition can be prepared into pellets by mixing the components and optional additives and melt extruding the mixture into the form of pellets using an extruder.

The thermally conductive resin composition can be used to mold many kinds of products. For example, the thermally conductive resin composition can be used in the preparation of various products such as a main body, chassis or heat radiating plate of most electronic appliances such as TVs, computers, cellular phones and appliances.

Hereinafter, the components and functions of the invention will be explained in greater detail with reference to the following examples. However, these examples are given for the purpose of illustration and not to be constructed as limiting the scope of the invention.

EXAMPLES

Example 1

(A) 60% by weight of polyphenylene sulfide resin, (B) 25% by weight of graphite having an aspect ratio (L/H) of 7,000 to 40,000, and (C) 15% by weight of milled pitch based carbon fiber having an aspect ratio (L/H) of 0.005 to 10 are mixed to prepare a thermally conductive resin composition.

Examples 1 to 5 and Comparative Examples 1 to 7

Examples 1 to 5 and comparative examples 1 to 7 are prepared in the same manner as example 1 except examples 1 to 5 and comparative examples 1 to 7 include the components in the amounts shown in the following Table 1.

The properties of the resin compositions prepared from the examples and the comparative examples are measured. The results are shown in the following Table 1.

The components in amounts shown in the following Table 1 are mixed and melted with each other and then extruded through an extruder to prepare pellets. The extruder is a twin-screw extruder having L/D=36, Φ=45 mm and heated at a temperature of 250 to 350° C. After the prepared pellets are dried at 90° C. for 3 hours, the pellets are injected using a 10-oz injector under conditions of a molding temperature of 300° C. to prepare specimens according to ASTM standards for measuring thermal diffusivity and impact strength.

Methods for Measuring Properties (1) The thermal diffusivity is measured in accordance with ASTM E1461.

(2) The izod impact strength is measured in accordance with ASTM D256 (⅛ inch, unnotched).

(3) The flowability is measured in accordance with the method of spiral flow. The specimen is injection-molded under the conditions of a barrel temperature of 340° C. and a mold temperature of 130° C. and an injection rate of 80% in the mold having a cross-section of 1 mm×10 mm and a spiral shape. The relative flowability between examples and comparative examples is measured by measuring the length filled with the resin composition in the mold.

TABLE 1

|  | Examples | | | | | Comparative Examples | | | | | | |
|---|---|---|---|---|---|---|---|---|---|---|---|---|
|  | 1 | 2 | 3 | 4 | 5 | 1 | 2 | 3 | 4 | 5 | 6 | 7 |
| Polyphenylene sulfide resin (A) | 60 | 60 | 50 | 50 | 50 | 60 | 60 | 50 | 50 | 50 | 50 | 50 |
| Graphite (B) | 25 | 20 | 20 | 25 | 30 | 25 | 20 | 20 | 20 | 30 | 40 | 40 |
| PAN based carbon fiber (C') |  |  |  |  |  | 15 |  | 30 |  |  |  |  |
| Pitch based carbon fiber (C'') |  |  |  |  |  |  | 20 |  | 30 | 20 | 10 |  |
| Milled pitch based carbon fiber (C) | 15 | 20 | 30 | 25 | 20 |  |  |  |  |  |  | 10 |
| Thermal diffusivity of plane-direction (cm²/sec) | 0.045 | 0.127 | 0.245 | 0.240 | 0.210 | 0.030 | 0.042 | 0.070 | 0.081 | 0.092 | 0.120 | 0.150 |
| Thermal diffusivity of Z-direction (cm²/sec) | 0.050 | 0.057 | 0.062 | 0.080 | 0.085 | 0.005 | 0.007 | 0.020 | 0.035 | 0.038 | 0.038 | 0.053 |
| Izod impact strength (J/m) | 510 | 427 | 380 | 362 | 350 | 720 | 510 | 530 | 430 | 400 | 380 | 300 |
| Flowablitity (mm) | 160 | 131 | 111 | 97 | 82 | 170 | 160 | 112 | 110 | 87 | 50 | 50 |

With reference to Table 1, Examples 1 to 5 including the milled pitch based carbon fiber (C) have excellent thermal conductivity in the plane-direction and thermal conductivity in the Z-direction compared to Comparative Examples 1 and 3 including the PAN based carbon fiber (C').

Further, Comparative Examples 2 and 4 to 6 have excellent thermal conductivity in the plane-direction. However, Comparative Examples 2 and 4 to 6 including non-milled pitch carbon fiber have low thermal conductivity in the Z-direction due to the orientation of carbon fiber during injection molding.

Comparative Example 7 includes milled pitch based carbon fiber (C). However, Comparative Example 7 has low flowability and impact strength because of the large amount of graphite.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermally conductive resin composition comprising:
   (A) about 40 to about 70% by weight of polyphenylene sulfide based resin;
   (B) about 20 to about 30% by weight of thermally conductive graphite, wherein the thermally conductive graphite (B) comprises a first thermally conductive graphite having a length-to-height ratio of about 7,000:1 to about 40,000:1; and a second thermally conductive graphite having a length-to-height ratio of about 10:1 to about 1,000:1; and
   (C) about 10 to about 30% by weight of milled pitch based carbon fiber.

2. The thermally conductive resin composition of claim 1, wherein the thermally conductive graphite (B) comprises the first thermally conductive graphite and the second thermally conductive graphite at a weight ratio of about 10:90 to about 90:10.

3. The thermally conductive resin composition of claim 1, wherein the thermally conductive graphite (B) and the milled pitch based carbon fiber (C) are mixed at a weight ratio of about 2:3 to about 3:1.

4. The thermally conductive resin composition of claim 1, wherein the milled pitch based carbon fiber (C) has an average diameter of about 10 to about 20 μm and a length of about 0.1 to about 100 μm.

5. The thermally conductive resin composition of claim 1, wherein the milled pitch based carbon fiber (C) has a length-to-height ratio (L/H) of about 1/200 to about 10:1.

6. The thermally conductive resin composition of claim 1, wherein the resin composition has a thermal diffusivity in a plane-direction of about 0.040 to about 0.250 cm2/sec and a thermal diffusivity in a Z-direction of about 0.050 to about 0.085 cm2/sec.

7. The thermally conductive resin composition of claim 1, wherein the resin composition has a flowability of more than about 80 mm.

8. A molded article made from the thermally conductive resin composition according to claim 1.

* * * * *